United States Patent

Ayd, III et al.

[15] 3,639,773
[45] Feb. 1, 1972

[54] THERMAL BATTERY INITIATION SEQUENCER

[72] Inventors: Frank J. Ayd, III; Stephen E. Long, both of Baltimore, Md.

[73] Assignee: Catalyst Research Corporation, Baltimore, Md.

[22] Filed: Mar. 20, 1970

[21] Appl. No.: 21,344

[52] U.S. Cl. .............................. 307/48, 136/83 R, 307/66, 323/8, 323/15, 323/25
[51] Int. Cl. .............................. H02j 7/34, H02j 9/00
[58] Field of Search ............... 136/83 R; 307/48, 50, 65, 66, 307/80, 81, 86, 297; 320/9, 33, 34, 43, 53; 323/8, 16, 19, 15, 22 SC, 25, 39, 69

[56] References Cited

UNITED STATES PATENTS

| 3,387,194 | 6/1968 | Banks | 307/50 X |
| 688,009 | 12/1901 | Siegel et al. | 307/81 |
| 2,836,734 | 5/1958 | Cichanowiez | 307/81 |
| 3,419,779 | 12/1968 | Zehner | 307/66 X |
| 3,483,393 | 12/1969 | Gutzmer et al. | 307/66 |

OTHER PUBLICATIONS

Nekrasov, " Shunt Type Voltage Regulator," RCA Technical Notes, TN No. 783, Sept. 25, 1968.

Primary Examiner—A. D. Pellinen
Attorney—Brown, Murray, Flick & Peckham

[57] ABSTRACT

Electrical circuitry for initiating or firing a series of thermal batteries in sequence at predetermined time intervals, thereby enabling a series of small thermal batteries to deliver a fixed voltage output over a period of time equal to a multiple of the operating time of each individual battery. Small batteries capable of delivering a high-current density may thus be used in place of a more expensive larger battery which cannot produce the current density of a smaller battery.

7 Claims, 1 Drawing Figure

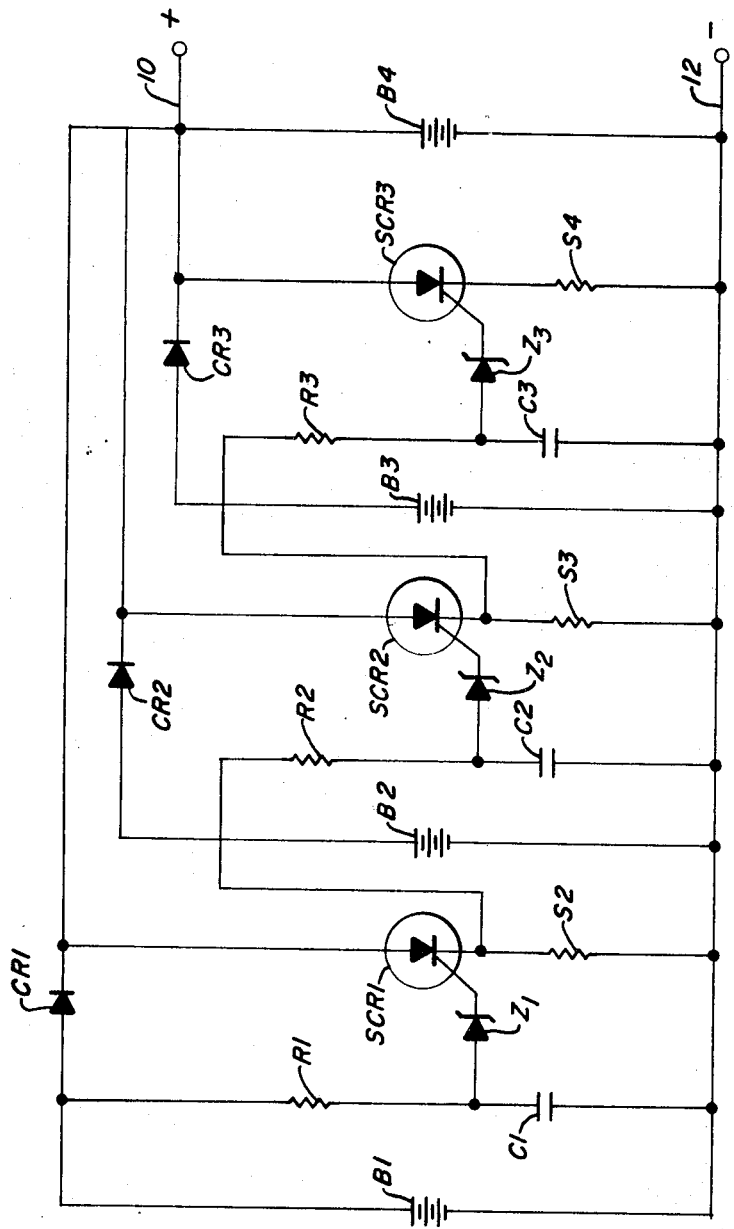
INVENTORS
FRANK J. AYD III
& STEPHEN E. LONG
By
BROWN, MURRAY, FLICK, PECKHAM
Attorneys

THERMAL BATTERY INITIATION SEQUENCER

BACKGROUND OF THE INVENTION

As is known, thermal battery cells typically consist of a series of dry plates or discs which are pressed together such that a small, compact voltage source is provided. These plates or discs are composed of dry materials which are capable of coacting to generate a voltage when the cell is activated by heating to a temperature sufficient to cause fusing of the electrolyte in the plates or discs. This heating may be accomplished chemically or by means of electrical igniters. Thermal batteries of this type have found extensive use in ordinance missile applications because they provide a compact source of voltage which is needed to energize vacuum tubes and other electrical equipment in the missile for a relatively short period of time.

Thermal batteries are expended in a relatively short period of time after the electrolyte is initially fused upon the application of heat, a battery life of 5 minutes being considered good. This lifetime can be increased by increasing the size of the battery; but the larger batteries are not capable of yielding current densities as high as those of the smaller batteries, are not capable of withstanding shock and vibration as well as the smaller batteries, and are more costly and difficult to manufacture. By initiating a series of parallel-connected, small thermal batteries in sequence, it is possible to obtain greater power output per unit volume over a longer period of time than with a large thermal battery without encountering the manufacturing difficulties, cost and limited dynamics of a large thermal battery.

SUMMARY OF THE INVENTION

In accordance with the present invention, a plurality of thermal batteries are turned on in sequence such that shortly before one battery is expended the next is activated, and so on, until the entire string of batteries has been turned on in sequence. All batteries are connected in parallel between a pair of output terminals, but are isolated one from the other by diodes such that an expended battery will not act as a load to a battery delivering current to the output terminals. In this manner, current densities can be maximized; and the period of time increased over which a predetermined voltage can be maintained across the output terminals. At the same time, the size of each individual battery can be maintained small enough so as not to encounter the difficulties inherent in larger batteries.

Preferably, the batteries are ignited in sequence to produce current by electrical igniters, such as the well-known electric match or squib, to ignite a combustible chemical composition that provides the necessary heat. This turns on each battery in sequence, causing it to charge a resistance-capacitance network. When the voltage across the capacitor in the aforesaid resistance-capacitance network reaches a predetermined level, and before the battery charging it has become expended, the igniter for the next battery in the sequence is connected to the preceding battery to cause the next battery to fire.

Preferably, the means for connecting the output of one battery to the igniter of the next succeeding battery comprises a semiconductive-controlled rectifier which is fired by a Zener diode, unijunction transistor or the like when the voltage across the capacitor in the aforesaid resistance-capacitance network reaches a predetermined level. The arrangement is such that shortly before one battery has become expended, the voltage across the capacitor which it has been charging will fire the semiconductive-controlled rectifier for the igniter of the next battery which will, in turn, charge a succeeding resistance-capacitance network in the series.

The above and other objects and features of the invention will become apparent from the following detailed description taken in connection with the accompanying single FIGURE drawing which schematically illustrates one embodiment of the invention.

DESCRIPTION OF PREFERRED EMBODIMENT

With reference now to the drawing, the system shown includes four thermal batteries, $B_1$, $B_2$, $B_3$ and $B_4$ connected in parallel between two output terminals 10 and 12. The positive terminals of batteries $B_1$, $B_2$ and $B_3$ are connected through rectifiers $CR_1$, $CR_2$ and $CR_3$ to the terminal 10 as shown. With this arrangement, rectifier $CR_1$ will block the flow of current from battery $B_2$ back through battery $B_1$; rectifier $CR_2$ will block current flow from battery $B_3$ back through battery $B_2$, and so on. As will be seen, this is necessary to prevent an expended battery from acting as a load to a succeeding, activated battery as the batteries are fired in sequence.

In order to initiate operation of the system, the heating element $S_1$ for battery $B_1$ is energized. This is preferably an electrical igniter such as an electric match or squib and is energized by an external source of power, not shown. It should be understood, however, that the initial battery $B_1$ can be fired or initiated by heat derived from a chemical reaction or other source of heat, if desired.

When battery $B_1$ is initiated, it serves as a source of potential between terminals 10 and 12. Assuming that a load is connected between the output terminals 10 and 12, current is delivered through rectifier $CR_1$. At the same time, when battery $B_1$ is activated or energized, it begins to charge the capacitor $C_1$ in a resistance-capacitance network comprising the resistor $R_1$ in series with capacitor $C_1$. The resistance-capacitance network just described has a long time constant, on the order of about 3 to 5 minutes, which is shorter than the expected life of battery $B_1$. When the voltage across capacitor $C_1$ reaches a predetermined level, in about 3 to 5 minutes after battery $B_1$ has been energized, Zener diode $Z_1$ breaks down; and since the cathode of Zener diode $Z_1$ is connected to the gate of semiconductive-controlled rectifier $SCR_1$, the rectifier fires, thereby delivering power from battery $B_1$ to the electrical igniter $S_2$ for battery $B_2$.

Igniter $S_2$ will now deliver heat to the battery $B_2$, which becomes activated. The battery $B_2$ will now deliver current through rectifier $CR_2$, but this current cannot flow back through battery $B_1$ by virtue of rectifier $CR_1$. When battery $B_2$ is initially activated, current will still be derived from battery $B_1$, but will ordinarily stop by the time battery $B_2$ has become expended.

When controlled rectifier $SCR_1$ fires, it connects a second resistance-capacitance network comprising resistor $R_2$ and capacitor $C_2$ between the output terminals 10 and 12. Consequently, capacitor $C_2$ will charge over a long time constant, again of about 3 to 5 minutes, until a second Zener diode $Z_2$ breaks down, thereby firing a second semiconductive-controlled rectifier $SCR_2$. When rectifier $SCR_2$ fires, the igniter $S_3$ for battery $B_3$ is energized, whereupon battery $B_3$ is activated and begins to deliver power to the output terminals through rectifier $CR_3$. Again, when rectifier $SCR_2$ fires, capacitor $C_3$ in resistance-capacitance network $R_3$–$C_3$ charges until Zener diode $Z_3$ breaks down and fires controlled rectifier $SCR_3$; whereupon the igniter $S_4$ for battery $B_4$ is energized to initiate the battery $B_4$.

In this manner, it can be seen that the batteries $B_1$ through $B_4$ are energized in sequence, each one being energized shortly before the next preceding battery is expended. This enables the delivery of high-current densities over a relatively long period of time without requiring large batteries and their attendant problems.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In apparatus for sequentially delivering power from a series of thermal batteries to a pair of output terminals, the combination of means connecting all of said batteries in parallel between said output terminals, normally deenergized heating means for each of said batteries which will cause its associated battery to deliver power to said output terminals when energized, means for energizing the heating means for the first of said batteries in said series, and electrical time delay means including resistance-capacitance networks connected to at least all but the last of said batteries in said series and actuable upon the delivery of power from its associated battery for energizing the heating means for the next succeeding battery in said series at the termination of a predetermined time following the initial delivery of power from said associated battery.

2. The apparatus of claim 1 wherein said heating means for each battery comprises an electrical igniter, at least some of said electrical igniters being energized by the next preceding battery in said series.

3. The apparatus of claim 2 wherein at least some of said electrical igniters are connected between the output terminals of an associated one of said batteries through a semiconductive-controlled rectifier having a control electrode, and means for connecting said time delay means to the control electrode of said semiconductive-controlled rectifier to cause it to fire after said predetermined time delay.

4. The apparatus of claim 3 including a plurality of switch devices, each switch device connecting a resistance-capacitance network of one time delay means to the control electrode of the semiconductive-controlled rectifier for a succeeding battery, said switch device being responsive to a predetermined voltage across the capacitor in said resistance-capacitance network for connecting said capacitor to the control electrode of said semiconductive-controlled rectifier for the succeeding battery.

5. The apparatus of claim 4 wherein said switch device comprises a Zener diode.

6. The apparatus of claim 1 wherein said predetermined time is a time less than the period of time during which a battery delivers power to said output terminals.

7. The apparatus of claim 1 wherein the means connecting all of said batteries in parallel between said output terminals includes unidirectional current devices which prevent current from an energized battery from flowing through a preceding battery in said series of batteries.

* * * * *